(12) United States Patent
Li et al.

(10) Patent No.: US 6,986,521 B1
(45) Date of Patent: Jan. 17, 2006

(54) VIBRATION SUPPRESSED BICYCLE STRUCTURE

(75) Inventors: Shan Li, Taoyuan (TW); Shyh-Jang Sun, Taoyuan (TW); Dauh-Churn Liu, Taoyuan (TW); Sheuan-Perng Lin, Taoyuan (TW); Dar-Ping Juang, Taoyuan (TW); Cheng-Huan Wang, Taoyuan (TW); Guang-Shyang Ger, Taoyuan (TW)

(73) Assignee: Chung Shan Institute of Science and Technology, Taoyuan (TW)

( * ) Notice: Subject to any disclaimer, the term of this patent is extended or adjusted under 35 U.S.C. 154(b) by 0 days.

(21) Appl. No.: 10/962,485

(22) Filed: Oct. 13, 2004

(51) Int. Cl.
*B62K 25/00* (2006.01)

(52) U.S. Cl. .................... 280/281.1; 280/283
(58) Field of Classification Search ............ 280/281.1, 280/283, 284, 275, 276; 310/326, 327
See application file for complete search history.

(56) References Cited

U.S. PATENT DOCUMENTS

| | | | |
|---|---|---|---|
| 4,822,042 A | 4/1989 | Landsman | |
| 4,849,669 A | 7/1989 | Ooms | |
| 5,315,203 A | 5/1994 | Bicos | |
| 5,645,260 A | 7/1997 | Falangas | |
| 5,775,715 A | 7/1998 | Vandergrift | |
| 5,857,694 A | 1/1999 | Lazarus et al. | |
| 6,026,939 A * | 2/2000 | Girvin et al. | 188/266.7 |
| 6,048,276 A | 4/2000 | Vandergrift | |
| 6,095,547 A | 8/2000 | Vandergrift et al. | |
| 6,102,426 A | 8/2000 | Lazarus et al. | |
| 6,164,424 A * | 12/2000 | Girvin et al. | 188/266.7 |
| 6,196,932 B1 | 3/2001 | Marsh et al. | |
| 6,196,935 B1 | 3/2001 | Spangler et al. | |
| 6,244,398 B1 * | 6/2001 | Girvin et al. | 188/316 |
| 6,335,648 B1 * | 1/2002 | Matsushita | 327/198 |
| 6,345,834 B1 | 2/2002 | Bianchini et al. | |
| 6,485,380 B2 | 11/2002 | Spangler et al. | |

* cited by examiner

*Primary Examiner*—Kevin Hurley
(74) *Attorney, Agent, or Firm*—Rabin & Berdo, P.C.

(57) ABSTRACT

An improved vibration suppressed bicycle structure includes a frame and a handle set that have ceramic piezoelectric elements located thereon to couple with passive and active control energy consuming mechanisms to convert the vibration energy of the bicycle body into electric energy, which is consumed in heat or gathered for active control use. The invention can absorb vibration energy of the bicycle to enhance structural performance, reduce vibration, and give bicycle riders more comfort over long distance rides and improved maneuverability.

7 Claims, 6 Drawing Sheets

VIBRATION SUPPRESSED BICYCLE STRUCTURE

FIELD OF THE INVENTION

The invention relates to a vibration suppressed bicycle structure, and particularly to a bicycle that has active and passive energy consumption mechanisms containing ceramic piezoelectric elements to convert the vibration energy of the bicycle body into electric energy, which is consumed in heat or gathered for use in active control to absorb vibration energy, enhance structural performance, and reduce vibration so that bicycle riders are more comfortable and have improved maneuverability.

BACKGROUND OF THE INVENTION

A conventional bicycle usually includes a frame, a handle set, a pedal set, a front wheel set and a rear wheel set. The pedal set and rear wheel set are coupled with a chain. The pedal set may be driven to rotate the rear wheel set to move the bicycle. Nowadays many bicycle riders ask not only speed, but also comfort during a long distance riding. Hence to make the bicycle rider comfortable while riding in high speed is an important issue of bicycle design. Improving shock absorption is also an issue of especially high priority.

The usual shock absorbing approach for the bicycle is to install springs between the frame and the front wheel set and the rear wheel set. This approach can absorb energy, but provides no improvement on the entire frame structure. And the riding maneuverability will become worse.

When a rider rides the bicycle on a road, vibrations are transferred from the front wheel set and the rear wheel set to the handle bars and the frame. This makes the user uncomfortable in a long distance ride. Hence it is a common practice to add shock-absorbing springs between the frame and the front wheel set and the rear wheel set to reduce vibration. However such an approach still cannot fully meet practical requirements, because the riding maneuverability will become worse when the speed is required.

SUMMARY OF THE INVENTION

The primary object of the present invention is therefore to provide active and passive energy consumption mechanisms that employ ceramic piezoelectric elements with a high damping effect to absorb the vibration energy of the bicycle body and reduce vibrations. Ceramic piezoelectric material has many desirable properties, such as a high piezoelectric coefficient, high dielectric constant, high mechanical damping, fast response and pliability. Connecting the piezoelectric material to an external shunt circuit, the mechanic characteristics of the piezoelectric material are affected, and the mechanical impedance characteristics change. By coupling the shunted piezoelectric elements to a structure, the loss coefficient increases. Hence, upon coupling with passive control and active control approaches, the vibration behaviors of the structure may be altered. These two control approaches have their advantages and drawbacks. They also may be used in a cooperative manner.

Another object of this invention is to utilize the characteristics of ceramic piezoelectric material such as the high piezoelectric coefficient, high dielectric constant, high mechanical damping, fast response and pliability to convert the vibration energy of the bicycle body to electric energy, which may be consumed in heat or gathered for use in active control to absorb vibration energy, enhance structural dynamic performance and reduce vibration to give bicycle riders a more comfortable ride.

To achieve the foregoing objects, this invention provides an improved vibration reduced bicycle structure. The structure has a frame that includes a upper tube, a head tube coupling with one end of the upper tube, a seat tube coupling with the other end of the upper tube, two rear upper forks coupling with an upper side of the seat tube, two rear lower forks coupling with the distal ends of the rear upper forks, a hub coupling with the two rear lower forks and the seat tube, a lower tube bridging the head tube and the hub, and a handle set movably coupled with the head tube. The bicycle frame has piezoelectric elements located on high strain areas when vibrating. Through the characteristics of piezoelectric elements such as the high piezoelectric coefficient, high dielectric constant, high mechanical damping and fast response, the active and passive energy consumption mechanisms of the bicycle that contains such piezoelectric elements can convert the bicycle body vibration energy into electric energy, which may be consumed in heat or gathered for use in active control to absorb vibration energy, enhance structural performance and reduce vibration.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
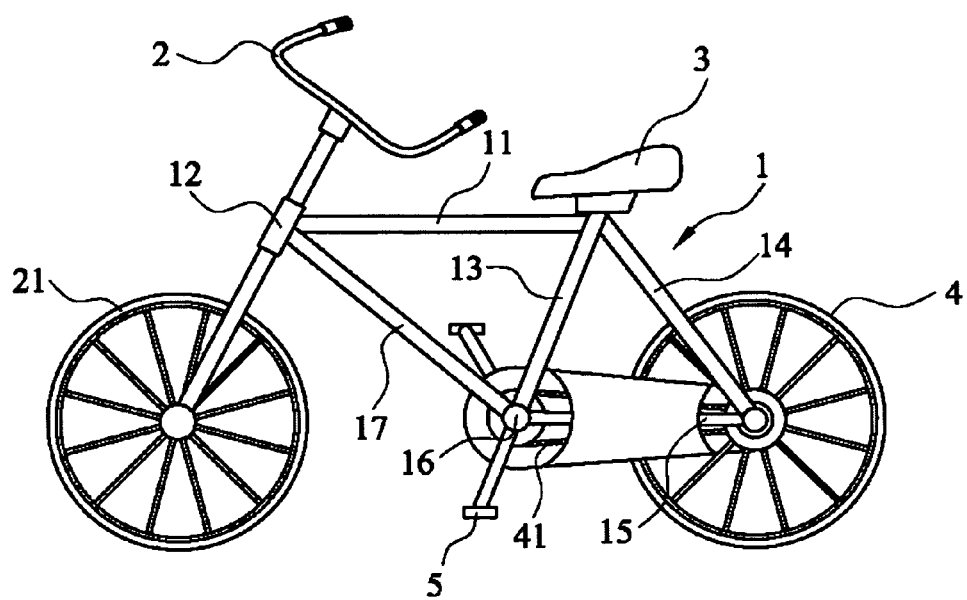
FIG. 1 is a schematic view of the invention.

Referring to FIGS. 1 through 5, the improved vibration suppressed bicycle structure according to the invention has a frame 1 that includes a upper tube 11, a head tube 12, a seat tube 13, two rear upper forks 14, two rear lower forks 15, a hub 16, a lower tube 17 and a handle set 2.

The head tube 12 is coupled with one end of the upper tube 11. The seat tube 13 is coupled with the other end of the upper tube 11. The two rear upper forks 14 are coupled with an upper side of the seat tube 13. The two rear lower forks 15 are coupled respectively with the distal ends of the rear upper forks 14. The hub 16 is coupled with the two rear lower forks 15 and the seat tube 13. The lower tube 17 bridges the head tube 12 and the hub 16. The handle set 2 is movably coupled with the head tube 12. The head tube 12 further is movably coupled with a front wheel set 21. The handle set 2 includes a handle 22, a stand 23 located in the middle of the front end of the handle 22, and a stem 24 fastened to the tail end of the stand. The seat tube 13 braces a seat 3. The rear forks 14 and 15 have distal ends to movably couple with a rear wheel set 4. The hub 16 is movably coupled with a pedal set 5. The pedal set 5 and the rear wheel set 4 are coupled with a chain 41 so that they move together.

Figure 2:
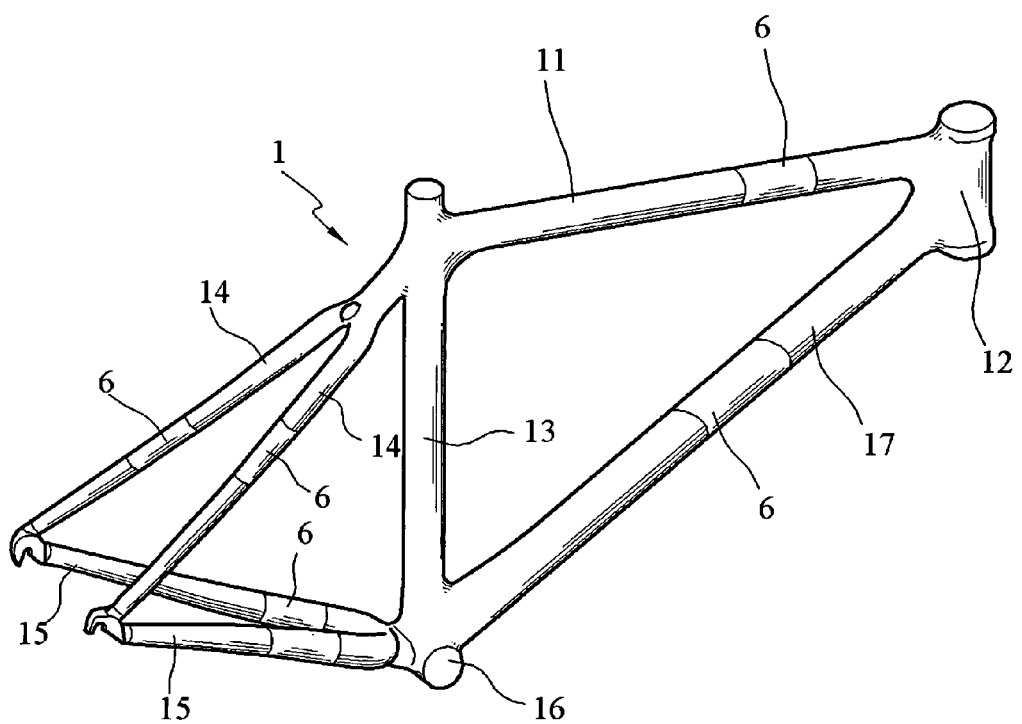
FIG. 2 is a schematic view of the frame and mounting locations of piezoelectric elements according to the invention.
Figure 3:
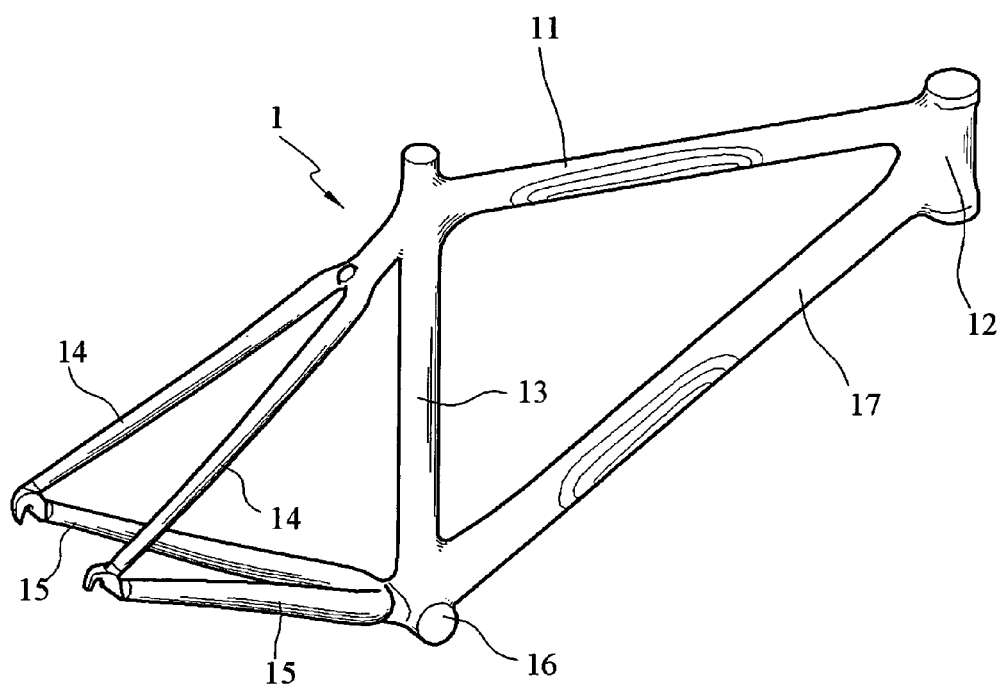
FIG. 3 is a schematic view of the frame showing strain distribution in a third vibrating model.
Figure 4A:
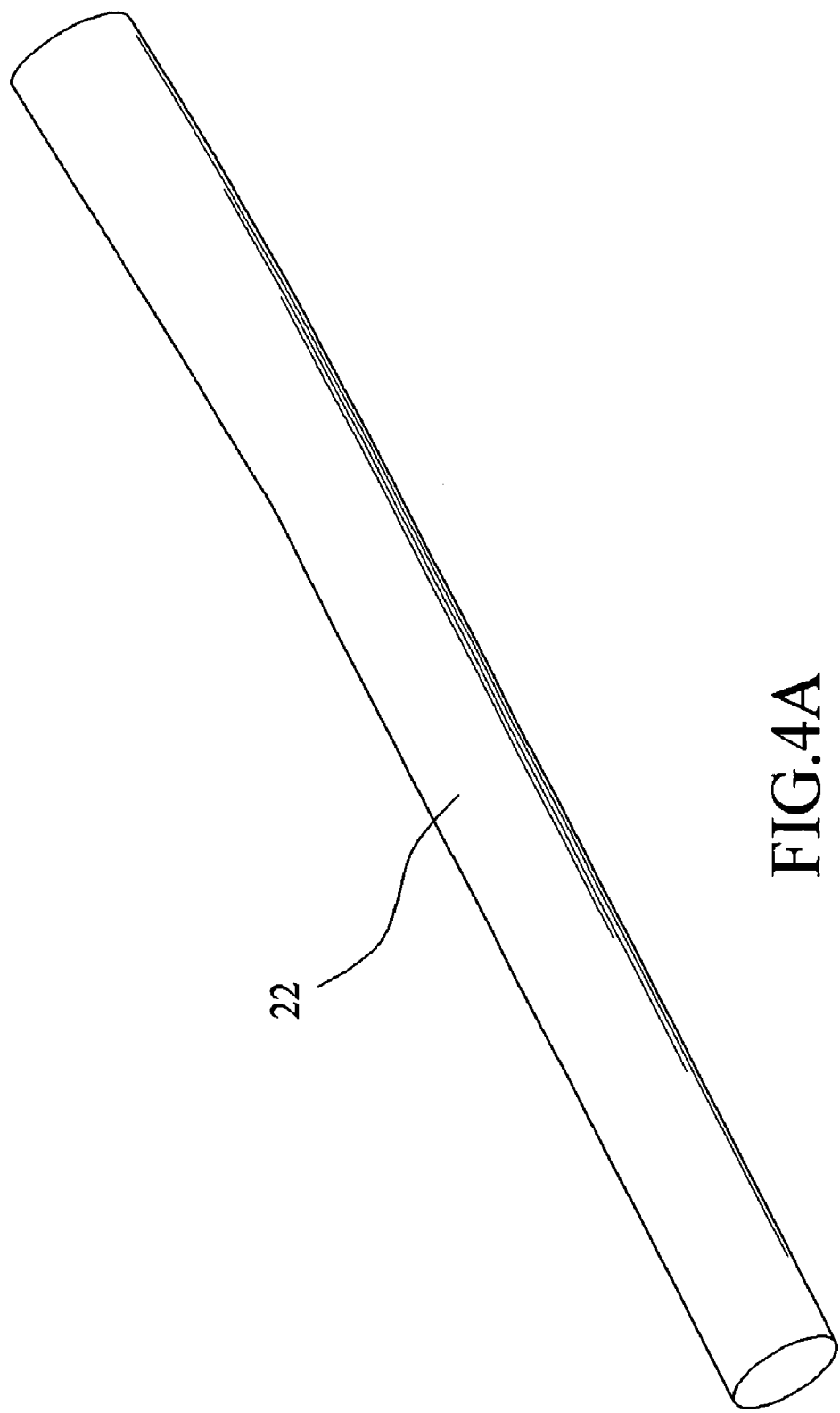
FIGS. 4A and 4B are schematic views of the handle set with piezoelectric elements mounted onto the high strain areas.
Figure 4B:
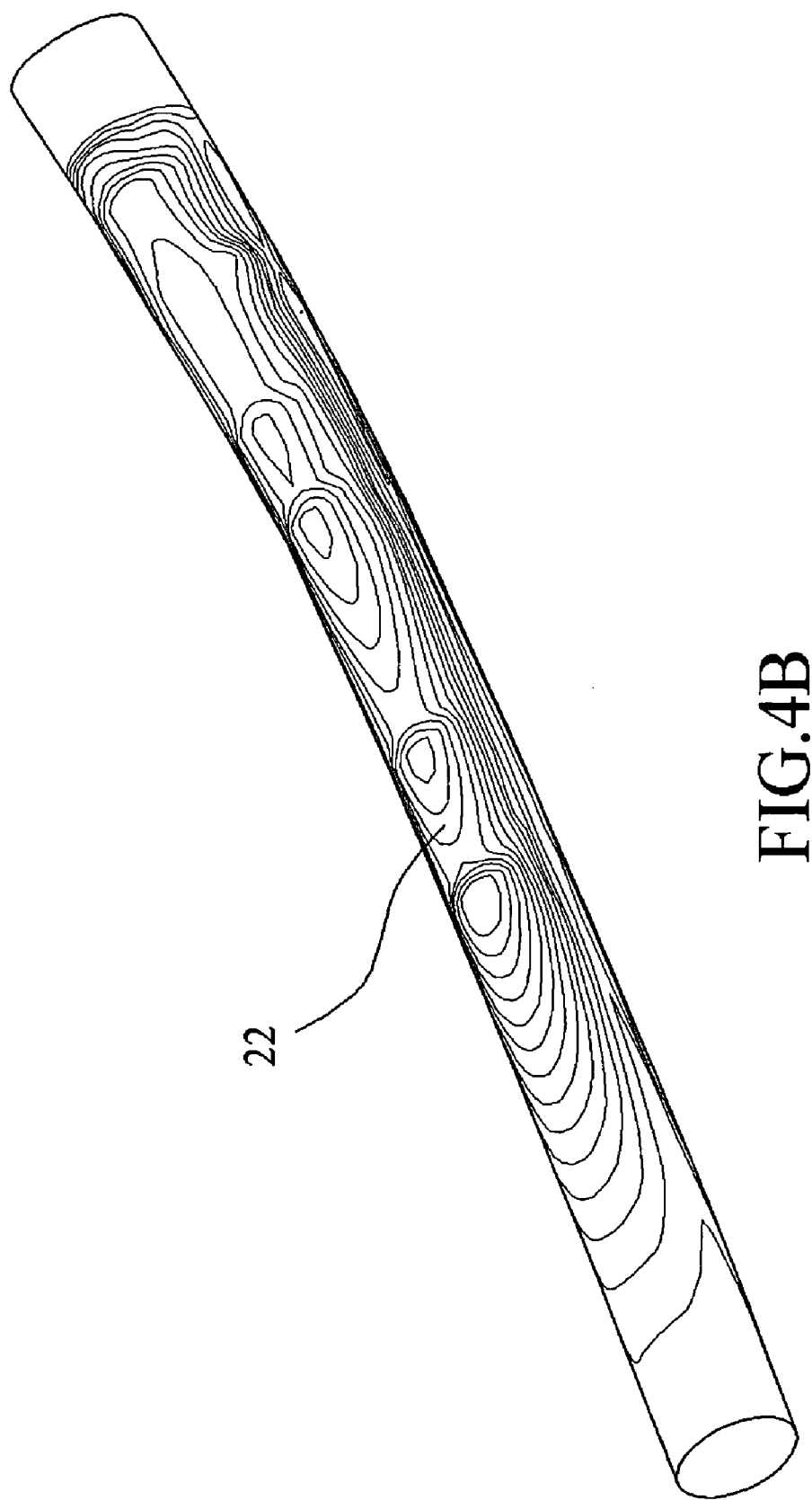

The high strain areas of the upper tube 11, lower tube 17, seat tube 13, two rear upper forks 14, two rear lower forks 15 and handle set 2 each have piezoelectric elements 6 located thereon (referring to FIGS. 2, 4A and 4B). The piezoelectric elements 6 may be made from lead zirconate titanate (PZT), and may be adhered to the surfaces or embedded in the upper tube 11, lower tube 17, seat tube 13, two rear upper forks 14, and two rear lower forks 15. The high strain areas of the frame 1 are detected by a vibration test model using a vibration frequency of 350 Hz (referring to FIG. 3). Hence the operation frequency of the piezoelectric elements 6 should be set proximately to the corresponding frequency of the vibrating model. For instance, if the size of a high strain vibration area is about 25×120 mm$^2$, the size of the piezoelectric element 6 is 25× 120×0.5 mm$^3$; that is, the length in the deforming direction is $l_1$=120 mm, the width is $l_2$=25 mm, and the thickness in the voltage direction is $l_3$=0.5 mm.

Figure 5:
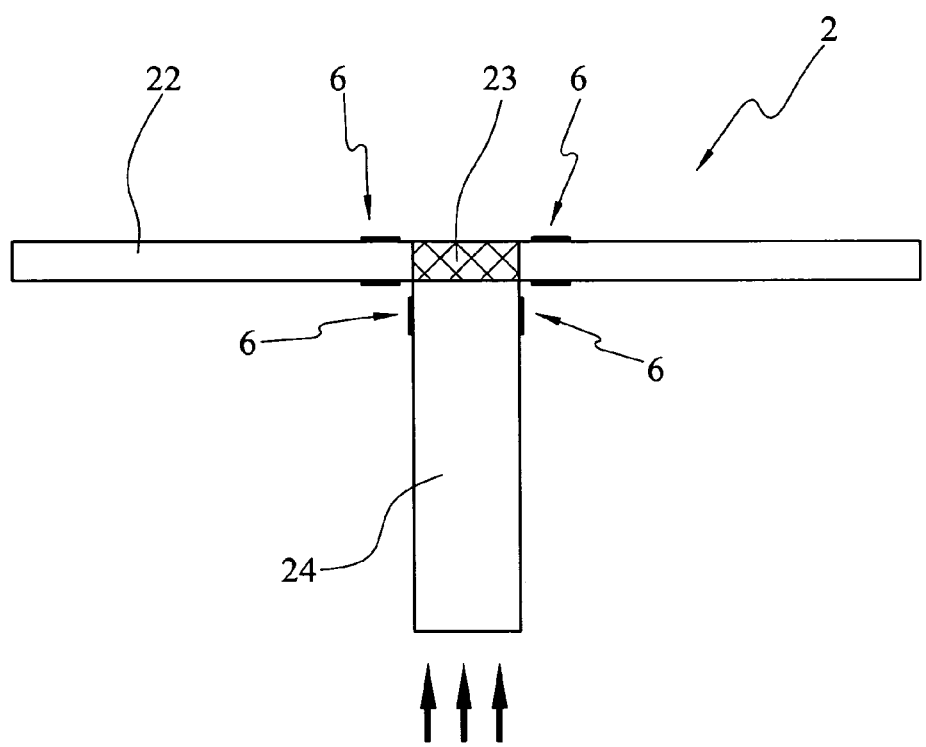
FIG. 5 is a schematic view of the handle in a vibrating condition.

The high strain vibration areas on the handle 22 and the stand 23 are detected by a vibration test model using a vibration frequency of 576.65 Hz (referring to FIG. 5).

Again, the operation frequency of the piezoelectric elements 6 should be set proximately to the corresponding frequency of the vibrating model. For instance, if the size of a high strain vibration area is about 20×120 mm$^2$, the size of the piezoelectric element 6 is 10×120×0.5 mm$^3$; that is, the length in the deforming direction is $l_1$=120 mm, the width is $l_2$=10 mm, and the thickness in the voltage direction is $l_3$=0.5 mm.

In order to improve the adhesion force of the piezoelectric element to the workpieces, the piezoelectric element may be formed in a ceramic sheet, a ceramic rod or a ceramic fiber in an arched shape or flexible manner. The effective piezoelectric performance of the piezoelectric element 6 depends on the length, width, thickness, and the design of electrodes.

The external shunt circuit connecting to the piezoelectric element also affects the mechanics characteristics and alters the mechanical impedance characteristics of the piezoelectric material. By coupling the shunted piezoelectric material and the structure, the loss factor increases. Hence piezoelectric element may be used to control passive structural vibration. The piezoelectric element coupled with an external resonant shunting device functions like a passive energy absorber. Multiple-mechanical impedance may be included in a modal system to achieve an optimization situation when suppress structural vibration. The passive control has many advantages such as not necessary to use external electric power and having higher stability. However, its control bandwidth is narrower. The active control detects the vibration signals of the structure. After processing by a designed device, equivalent mass, damping and stiffness control forces are externally fed to the system to alter the vibration characteristics of the structure. Both types have their advantages and drawbacks, respectively. They may also be coupled together in use. After the piezoelectric element 6 has been polarized, it has a positive and inverse piezoelectric effect. When subject to the action of an external electric field, the distance between the electrodes is stretched. Depending on different designs, the piezoelectric element 6 is extended parallel or normal to the direction of the electric field, and can convert electric energy to mechanical energy. On the other hand, when the piezoelectric element 6 is subject to compression, the distance between electrodes will shrink under compression. Meanwhile, the distance between electrodes resists such an action and generates a voltage to maintain the original condition. The invention employs the characteristics of the piezoelectric element 6 such as a high piezoelectric coefficient, high dielectric constant, high mechanical damping, fast response and pliability on the bicycle frame 1 and handle set 2 to convert the vibration energy of the bicycle body to electric energy, which is consumed in heat or generate the power for use in active control to absorb vibration energy of the frame 1 and handle 2. As a result, the piezoelectric element 6 becomes a passive energy consuming mechanism that generates a high damping effect. Therefore structural performance is enhanced and vibration is reduced, which makes bicycle riders more comfort while riding.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An improved vibration suppressed bicycle structure for a bicycle frame, the bicycle frame comprising: a upper tube, a head tube coupling with one end of the upper tube, a seat tube coupling with other end of the upper tube, two rear upper forks coupling with a upper side of the seat tube, two rear lower forks coupling with distal ends of the rear upper forks, a hub coupling with the two rear lower forks and the seat tube, a lower tube bridging the head tube and the hub, and a handle set movably coupled with the head tube;

wherein the structure, including the upper tube, the lower tube, the head tube, the seat tube, the two rear upper forks, the two rear lower forks and the handle set, has ceramic piezoelectric elements located on high strain areas to form active and passive mechanisms of a damping effect to absorb a portion of vibration energy of the bicycle to reduce vibrations.

2. The improved vibration suppressed bicycle structure of claim 1, wherein the piezoelectric elements are adhered to the selected locations of the upper tube, the lower tube, the head tube, the seat tube, the two rear upper forks, the two rear lower forks and the handle set.

3. The improved vibration suppressed bicycle structure of claim 1, wherein the piezoelectric elements are embedded in selected locations of the upper tube, the lower tube, the head tube, the seat tube, the two rear upper forks, the two rear lower forks and the handle set.

4. The improved vibration suppressed bicycle structure of claim 1, wherein the piezoelectric elements have varying effective piezoelectric power according to alterations of the length, width and thickness of the piezoelectric elements, and the design of electrodes.

5. The improved vibration suppressed bicycle structure of claim 1, wherein the piezoelectric elements are made from lead zirconate titanate (PZT).

6. The improved vibration suppressed bicycle structure of claim 1, wherein the handle set includes a handle, a stand coupling to a middle portion of a front end of the handle and a stem fastening to a distal end of the stand.

7. The improved vibration suppressed bicycle structure of claim 1, wherein the bicycle frame and the handle set are made from metal or carbon fiber reinforced plastics.

* * * * *